United States Patent
Aragon et al.

(10) Patent No.: US 11,940,790 B2
(45) Date of Patent: Mar. 26, 2024

(54) SAFE HAND-OFF BETWEEN HUMAN DRIVER AND AUTONOMOUS DRIVING SYSTEM

(71) Applicant: Allstate Insurance Company, Northbrook, IL (US)

(72) Inventors: Juan Carlos Aragon, Redwood City, CA (US); Regina Madigan, Mountain View, CA (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 437 days.

(21) Appl. No.: 16/710,966

(22) Filed: Dec. 11, 2019

(65) Prior Publication Data

US 2020/0192359 A1    Jun. 18, 2020

Related U.S. Application Data

(60) Provisional application No. 62/778,463, filed on Dec. 12, 2018.

(51) Int. Cl.
*G05D 1/00* (2006.01)
*G05D 1/02* (2020.01)
*G06N 3/04* (2023.01)
*G06N 3/08* (2023.01)

(52) U.S. Cl.
CPC ......... *G05D 1/0061* (2013.01); *G05D 1/0221* (2013.01); *G06N 3/04* (2013.01); *G06N 3/08* (2013.01); *G05D 2201/0213* (2013.01)

(58) Field of Classification Search
CPC ..... B60W 2050/0088; B60W 60/0053; B60W 40/08; B60W 2050/0075; B60W 2556/10; G05D 1/0061; G05D 1/0221; G05D 2201/0213; G06N 3/006; G06N 3/04; G06N 3/0427; G06N 3/0454; G06N 3/08; G06N 7/005; B60K 28/06; B60K 28/066; B60Y 2400/30; B60Y 2400/90

See application file for complete search history.

(56) References Cited

U.S. PATENT DOCUMENTS

| | | | |
|---|---|---|---|
| 8,433,470 B1 * | 4/2013 | Szybalski | G06F 3/04842 701/41 |
| 9,690,292 B1 | 6/2017 | Chan et al. | |
| 9,875,440 B1 | 1/2018 | Commons | |
| 10,663,965 B2 * | 5/2020 | Yako | B60W 50/12 |
| 10,717,448 B1 * | 7/2020 | Seo | G05D 1/0022 |
| 10,935,974 B1 * | 3/2021 | Fields | B60W 60/0053 |
| 11,061,399 B2 * | 7/2021 | Bhalla | B60W 50/14 |

(Continued)

OTHER PUBLICATIONS

Feb. 21, 2020—(WO) International Search Report & Written Opinion—PCT/US19/065937.

(Continued)

*Primary Examiner* — Babar Sarwar
(74) *Attorney, Agent, or Firm* — Polsinelli PC (57) ABSTRACT

Methods, computer-readable media, software, and apparatuses may determine whether a human driver, or an autonomous driving system, should be in control of a vehicle in response to a detection of an unexpected event. A decision may be made to pass control from the autonomous driving system to the human driver, if it is determined that the human driver can handle the unexpected event more safely than the autonomous vehicle.

18 Claims, 4 Drawing Sheets

(56) References Cited

U.S. PATENT DOCUMENTS

| | | | |
|---|---|---|---|
| 2009/0040054 A1 | 2/2009 | Wang et al. | |
| 2014/0195272 A1 | 7/2014 | Sadiq et al. | |
| 2015/0070160 A1 | 3/2015 | Davidsson et al. | |
| 2015/0094898 A1* | 4/2015 | Tellis | B60W 50/045 701/23 |
| 2015/0191177 A1* | 7/2015 | Boss | B60K 28/066 701/1 |
| 2015/0283998 A1* | 10/2015 | Lind | B60W 60/0055 701/23 |
| 2016/0334229 A1* | 11/2016 | Ross | G08G 1/161 |
| 2017/0038773 A1* | 2/2017 | Gordon | G08G 1/096775 |
| 2017/0124658 A1* | 5/2017 | Gordon | G06Q 40/08 |
| 2017/0132708 A1* | 5/2017 | Gordon | G06Q 40/08 |
| 2017/0349186 A1* | 12/2017 | Miller | B60W 50/14 |
| 2017/0369072 A1* | 12/2017 | Huber | B60W 30/09 |
| 2018/0032072 A1* | 2/2018 | Hoye | B60W 50/082 |
| 2019/0107840 A1* | 4/2019 | Green | B60W 30/18154 |
| 2020/0097797 A1* | 3/2020 | Aragon | H04L 67/12 |
| 2021/0089052 A1* | 3/2021 | Cho | G05D 1/0088 |

OTHER PUBLICATIONS

International Preliminary Report on Patentability for International Application No. PCT/US2019/065937, dated Jun. 24, 2021, 8 Pages.

* cited by examiner

SAFE HAND-OFF BETWEEN HUMAN DRIVER AND AUTONOMOUS DRIVING SYSTEM

CROSS-REFERENCE TO RELATED APPLICATIONS

This application claims the benefit of and priority to U.S. Provisional Patent Application Ser. No. 62/778,463, filed Dec. 12, 2018, and entitled "Safe Hand-Off Between Human Driver and Autonomous Driving System," the contents of which is incorporated herein by reference in its entirety for all purposes. This application also incorporates by reference in their entireties for all purposes the following related applications: U.S. application Ser. No. 16/232,210, filed Dec. 26, 2018, entitled "Processing System For Evaluating Autonomous Vehicle Control Systems Through Continuous Learning" and U.S. application Ser. No. 16/580,353, filed Sep. 24, 2019, entitled "Adaptable On-Deployment Learning Platform for Driver Analysis Output Generation."

TECHNICAL FIELD

Aspects of the disclosure generally relate to one or more computer systems and/or other devices including hardware and/or software. In particular, aspects of the disclosure generally relate to enabling a safe hand-off between a human driver and an autonomous driving system.

BACKGROUND

Some automobiles now provide a feature or mode wherein the automobile can drive itself, in some scenarios. This mode may be referred to as an autonomous driving mode, and may be implemented in an autonomous driving system in the vehicle. In many driving situations, the autonomous driving mode may be safer than a non-autonomous mode, in which a human driver controls the operation of the vehicle. However, there will be driving situations in which an unexpected event occurs, and the autonomous mode may not be prepared to handle the event gracefully or safely. In some such cases, the autonomous driving system, being unprepared for the situation, may resort to a default behavior, such as pulling over and stopping. However, in a least some of these cases, a human driver may have been able to safely handle the driving situation, and it would not have been necessary to pull over and stop. Accordingly, there is a need for a method to determine when a human driver can be expected to safely take control of a vehicle, in response to an unexpected event, and to cause an autonomous driving system to relinquish driving control to the human driver.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In some aspects, a decision system may include at least one processor and a memory unit storing computer-executable instructions. The computer-executable instructions may, in some embodiments, include a machine learning algorithm, such as a neural network. The decision system may be configured to, in operation, make a determination regarding whether a human driver can safely take control of the operation of a vehicle, or whether an autonomous driving system should continue to control the operation of the vehicle. The decision system may be configured to cause the autonomous driving system to relinquish control of the vehicle to the human driver.

In some aspects, the decision system may characterize the human driver and/or the autonomous driving system and use these characterizations in determining whether the human driver or the autonomous driving system should be given driving control of the vehicle.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for determining whether a human driver can safely take control the operation of a vehicle that is being operated by an autonomous driving system. In some embodiments, the determining may be performed by a guard sub-system and/or by a neural network. A validation sub-system may monitor an outcome of a decision and provide feedback to improve future decisions. A "sub-system" is a term of art and as used herein will be readily understood by those having ordinary skill in the art.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
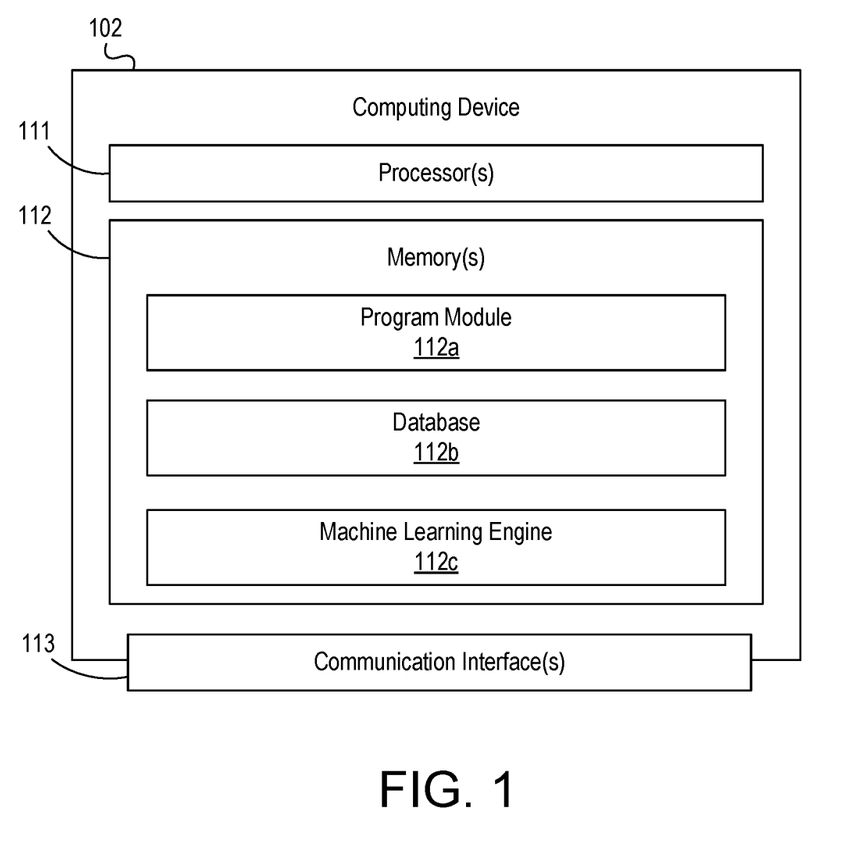
FIG. 1 illustrates an example computing device that may be used in a decision system in accordance with one or more aspects described herein.

Referring to FIG. 1, a computing device 102, as may be used in such a decision system, may include one or more processors 111, memory 112, and communication interface 113. A data bus may interconnect processor 111, memory 112, and communication interface 113. Communication interface 113 may be a network interface configured to support communication between computing device 102 and one or more networks. Memory 112 may include one or more program modules having instructions that when executed by processor 111 cause the computing device 102 to perform one or more functions described herein and/or one or more databases that may store and/or otherwise maintain information which may be used by such program modules and/or processor 111. In some instances, the one or more program modules and/or databases may be stored by and/or maintained in different memory units of computing device 102 and/or by different computing devices that may form and/or otherwise make up the decision system. For example, in some embodiments, memory 112 may have, store, and/or include program module 112a, database 112b, and/or a machine learning engine 112c. Program module 112a may comprise a validation sub-system module which may have or store instructions that direct and/or cause the computing device 102 to execute to validate decisions determined by other modules operating on the computing device 102 or operating on other computing devices. Program module 112a may comprise a guard sub-system module, as discussed in greater detail below. The guard sub-system module may have or store instructions that direct and/or cause the computing device 102 to determine a decision based on various inputs. Machine learning engine 112c may have or store instructions that direct and/or cause the computing device 102 to determine a decision based on various inputs.

As noted above, different computing devices may form and/or otherwise make up the decision system. In some embodiments, the one or more program modules described above may be stored by and/or maintained in different memory units by different computing devices, each having corresponding processor(s), memory(s), and communication interface(s). In these embodiments, information input and/or output to/from these program modules may be communicated via the corresponding communication interfaces.

Autonomous driving systems are commonly classified by their level of driving automation. For example, the level zero is typically assigned to a system wherein the human driver performs all driving tasks, such as steering, accelerating, and braking (e.g. no driving automation). Level one systems provide some driver assistance, such as an automated cruise control. Some vehicles are currently operating at level two, wherein the autonomous driving system can handle steering and acceleration, but the human driver remains responsible for ensuring safety. In level three systems, the autonomous driving system may be able to automate driving, with the condition that the human driver remains alert to take over if the autonomous system is unable to handle an environmental condition. At level four, the autonomous driving system can intervene, or take over vehicle control, in order to protect the human driver or to prevent an accident, but the human driver typically would still have the option to override the autonomous system. A fully automated driving system would be considered a level five, where there would no longer be a driving function for the human passenger.

At various levels, it may be necessary for either a human driver or an autonomous driving system to take control of the vehicle, in different driving situations. For example, with level two-autonomy, there may be driving situations/scenarios (e.g., aggressive neighbor drivers) that have not been seen before by the autonomous driving system, and thus were not included as part of the system's original training. In these cases, an autonomous driving system may stop and park the vehicle, or may ask the human driver to intervene. In some cases, the latter option may be the preferred option, so that the efficiency and practicality of the technology is maintained. However, this may be situational, and in some cases, based on the human driver's skill and the timing of an unsafe situation on the horizon, it may be most safe to have the vehicle pull over, rather than trying to re-engage the human driver.

Accordingly, even with level two autonomy, a safe-guard that allows the autonomous driving system to surrender control to the human driver needs to be in place.

As disclosed herein, in some embodiments, a decision system may determine when a hand-off of driving control should occur. Ideally the hand-off should occur when the human driver is deemed to be able to go through the driving situation in a safer and/or more efficient way than the autonomous driving system. In some embodiments, knowing when to perform the hand-off may require knowing the specific characteristics of the driving style of the human driver, since performing an accurate assessment of a successful hand-off may require knowing which agent is better under a given driving situation (the human agent or the autonomous driving agent).

In some embodiments, the determination may be based on a model of the driving characteristics of the particular human driver behind the steering wheel. In some embodiments, such a characterization may be generated in the field, because the human driver may be unknown before the autonomous driving system is deployed. In these embodiments, the autonomous driving system may observe the human driver driving over a period of time, and may collect relevant data through an array of sensors (such as visible light camera, light detection and ranging (LiDAR) technology, radar, etc.). As a result of the observation period, the system may, in some embodiments, generate a model that may capture specific attributes personalized for the human driver, such as driving skills, reaction time, levels of attentiveness, levels of stress/frustration under given driving situations, decision making skills, and negotiation skills. Thus, the decision system may learn to characterize the human driver.

In some embodiments, the decision system may store the characteristics for one or more human drivers in database 112b or other memory 112. In various embodiments, a human driver currently in control of a vehicle may be identified by a unique key remote used to start or unlock the vehicle, or may be identified using other means, such as via biometric information (for example, through use of an image captured via a camera or through a fingerprint sensor), or via a unique entry code used to access the vehicle.

Figure 2:
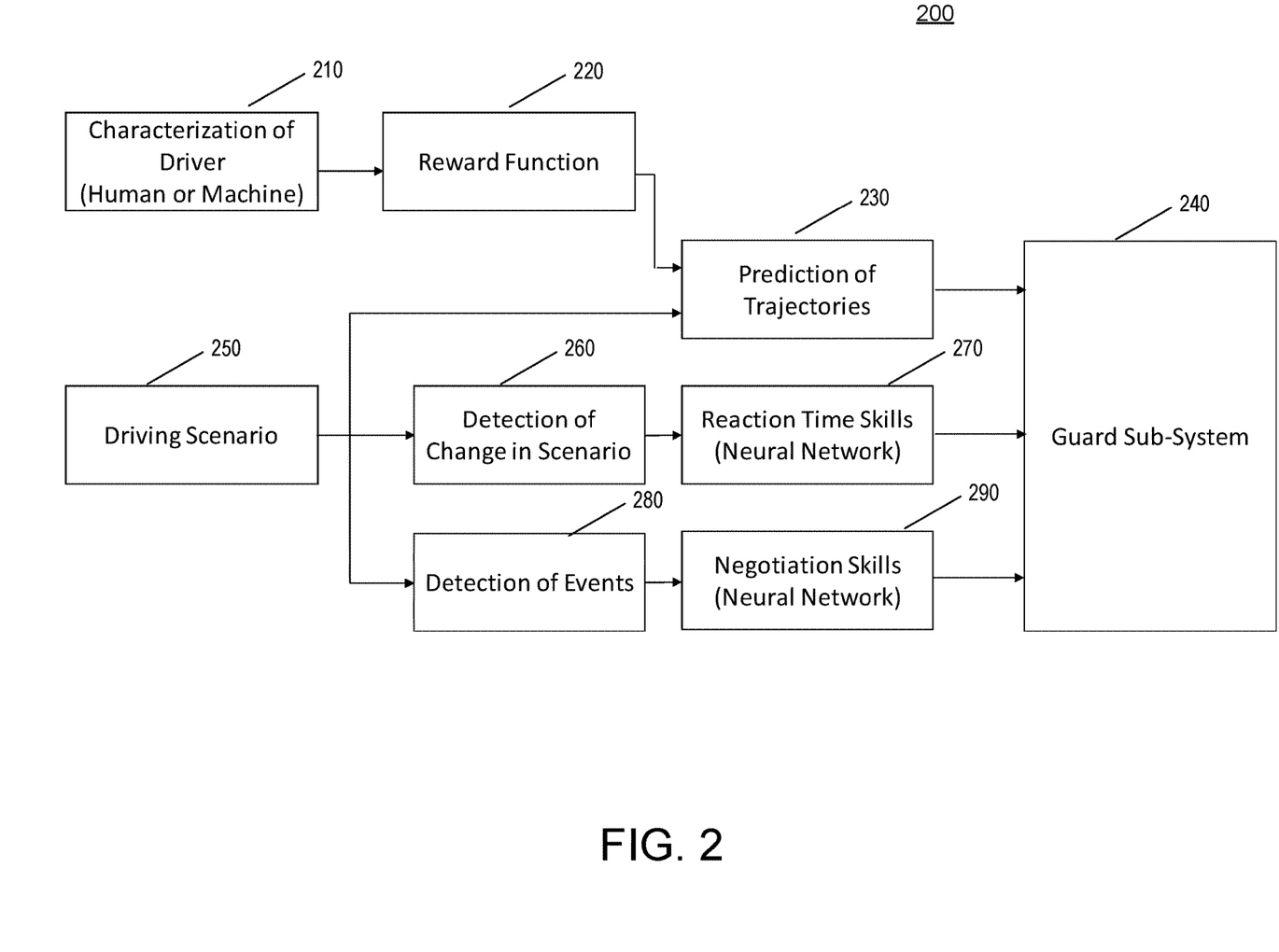
FIG. 2 is a block diagram illustrating characterization of a human driver in accordance with one or more aspects described herein.

As discussed in more detail below, information from this characterization may be, as shown in FIG. 2, input into a guard sub-system 240 which may, in some embodiments, make a determination as to whether the human driver should take control from the autonomous driving system.

Similarly, in some embodiments, the decision system may perform a characterization of the autonomous driving system actions (this characterization may be needed, for example, in case the vehicle performance and/or sensors degrade over time), especially under driving situations unseen by the autonomous driving system. Additionally, continuous characterization of the autonomous driving system may be beneficial, since the autonomous driving system may continuously self-modify to adapt and self-improve, thereby changing its behavior.

The characterization of the human driver 210 may be performed by applying the methods disclosed in U.S. application Ser. No. 16/580,353 titled "Adaptable On-Deployment Learning Platform for Driver Analysis Output Generation." The result of the human characterization may provide information on the driving skills, decision skills, etc. which may be used to evaluate whether the human driver can safely handle driving situations where the autonomous driving system fails.

In some embodiments, the evaluation may be performed by simulating, based on the human driver characteristics and the driving scenario under consideration. The simulation may be based on parameters such as driving skills, decision skills parameters, etc.

In some embodiments, the human driver may be characterized through reinforcement learning. Referring again to FIG. 2, in these embodiments, a reward function 220 may be expressed in terms of the human driver characteristics, and thus it may be used to generate simulated driving actions for the specific human driver, such as a prediction of trajectories 230.

In some embodiments, the reward function 220 may provide a scoring of state and action pairs, thus providing an assessment of a benefit obtained as a result of taking a specific action from a given state. For example, the reward function 220 may provide a scoring of a given driving action, such as accelerating or changing a heading, given a specific state of the vehicle, such as a given vehicle speed, heading, and position with reference to road lanes.

In some embodiments, the reward function 220 may be assumed to be an approximation of an internal human reward that may provide a guiding component for assessing the best driving actions in a reinforcement learning scheme that approximates the human process for decision of driving actions. More specifically, the reward function 220 may provide guidance on what driving actions are preferred, given the current situation of the vehicle, in order to maximize safety, performance, or both.

The reward function 220 may be considered as a function that involves an assessment of the final state achieved after the action has been taken. For instance, the resulting final heading after applying a heading change in the vehicle (by means of moving the steering wheel a given angle) may induce a reward value that corresponds to how close the final heading is to the heading that the human driver would prefer.

In some embodiments, the reward function 220 may be separated into two components. The first of these components may be a feature function and the second one may be a weight assigned to this function. Thus, in some embodiments, the reward function value may be generated by multiplying the feature function output value by the weight value. In some embodiments, a feature function may provide a measure of reward, given a specific characteristic of driving. For instance, vehicle speed is a characteristic of driving, and a feature function may provide a value that is directly proportional to the difference between the legal speed limit and the current vehicle speed. In this sense, the greater the difference in speeds, the higher the value of the feature function. The weight value may multiply the output of the feature function and thus it may provide a measure of how important this feature function is to the human driver. In the feature function mentioned above that measures vehicle speed, a negative weight value may indicate that the reward function values higher vehicle speeds (higher speeds will make the reward function output less negative). If the weight value is positive, then this may indicate that the reward function values slower speeds (which make the reward function more positive).

In some embodiments, a reward function 220 may generated by adding multiple feature functions (each multiplied by their corresponding weight). For instance, in some embodiments, a final reward function may be the sum of three weighted feature functions: the first assessing vehicle speed (as described previously), the second a feature function assessing heading, and the third feature function assessing distance to a lane marker. In this formulation, the weights not only indicate the direction of the reward (positive or negative), but also the intensity with which the specific feature function influences the final reward function. A weight of zero (or close to zero), for instance, may indicate that the feature function has no influence on the final reward function.

Human driving may be characterized by the weights that multiply the feature functions as mentioned above. Some human drivers, for instance, may value more being centered in the lane, in order to avoid being too close to other neighboring vehicles. Other drivers may value more to drive as close as possible to the speed limit. These weights can be obtained/estimated by observing the state of the vehicle in operation.

This characterization may be based on the dynamics of driving. An estimation process may be performed on-line (while the human driver is driving). In this estimation process, the reward function 220 may be used to identify the characteristics of the human driver. The estimation process may assume an initial set of weights. Then, upon observation of a specific driving action taken by a human driver, the weights of the reward function 220 may be modified according to an optimization process (for example, based on any Gauss-Newton type of optimization) that maximizes the probability of the observed action (to be more specific, this may be a conditional probability and may be conditioned on the reward function weights). To assist with the estimation process, computer vision technology may be applied to footage generated by a camera, such as a dash mounted camera, in the vehicle. In this case, computer vision may be used to identify specific driving actions taken by the human driver using metrics such as vehicle heading, absolute vehicle speed, and current acceleration.

The weights characterizing human driving style, once computed, may be used to compute an optimal policy for driving actions, since a customized reward function will be generated for this driver. In reinforcement learning, a policy may be a probability distribution of driving actions, given a specific vehicle state (vehicle position, vehicle speed, acceleration, etc.). Once the optimal policy is computed for a given human driver (for example, after a value-iteration/policy-iteration process typical of reinforcement learning converges), then it may be possible to predict what particular actions the human driver is most likely to perform, given the current state of the vehicle. The prediction in this case may be customized to the specific human driver. This prediction may be a useful output that can be used by the methods described herein to assess the safety and performance of the predicted driving that the human will perform, with the added benefit that the prediction may reflect the specific characteristics and preferences of the human driver.

It should be noted that the characterization based on weights of the reward function mentioned above allows to characterize one aspect of the driving which is related to the dynamics of driving (which encompasses aspects related to the mechanics of driving such as position, heading, speed, and acceleration). There are other aspects of driving that may be characterized as well, such as driving skills, which involve reaction time skills 270 and negotiation skills 290. This type of characterization may be provided through the methods described in U.S. application Ser. No. 16/580,353 titled "Adaptable On-Deployment Learning Platform for Driver Analysis Output Generation."

In some embodiments, the characterization of driving skills may be encoded through various parameters. A vehicle may be in a certain driving scenario 250 when a change 260 is detected in the driving scenario. Reaction time skills 270 may be determined based on an action taken after the change in scenario is detected. For instance, reaction time skills 270 may be encoded as a minimum reaction time in seconds when a change in speed happens with the vehicle in front of the ego-vehicle (e.g., a vehicle corresponding to the autonomous vehicle system). These reaction times may be learned separately from the reward function through a neural network, for a given change in driving scenarios (a driving scenario in this case is a given distribution of surrounding vehicles with given positions, headings, speeds, and accelerations). The change in driving scenario may be considered an event. The output of the neural network may be the expected reaction time under the given scenario change (the scenario change may be encoded by the current scenario and the differences generated by the scenario change and this encoding may be the input to the neural network). A threshold may indicate if the differences are high enough to merit consideration in determining a reaction time and training the neural network on this reaction time. In addition to the change in driving scenario, the level of attentiveness that the driver has at any moment may be an input to the neural network and may add to the final reaction time that the neural network outputs. As explained below, this level of attentiveness may be continuously monitored for the driver (the human driver and/or the autonomous driving system).

Negotiation skills 290 may be learned through another neural network, which may be trained through some events, such as a cut-in maneuver from a surrounding vehicle (this may involve event detection as a sub-system). In this case, an event detection for a situation that might provoke conflict between the ego-driver and a surrounding driver may be detected 280. The difference between the event being considered here and the change in driving scenario mentioned above is that a conflict will be detected in this case by determining that the event generates an obstacle to the vehicle to achieve a planned goal. For instance, a cut-in maneuver could be in conflict with the goal of keeping a safe distance from a leader vehicle. A change in scenario may be more general and might not provoke a conflict. For instance, if the leader vehicle reduces speed, the ego-vehicle may reduce speed accordingly and this change in scenario may not provoke any conflict with the goal of maintaining a desired speed. In case of events, the outcome of such an event may be evaluated by the level of risk that developed during the driving scenarios that followed the event (for instance the level of proximity to surrounding vehicles through the driving scenarios following the event may be an indicator of risk). For example, whether the ego-driver allowed space for the other vehicle to merge in, or whether the ego-driver sped up—these are indications of the negotiation skill of the ego-driver. The neural network determining the negotiation skills 290 may be trained with inputs that encode the event (number of surrounding vehicles, positions, speeds, and accelerations of the surrounding vehicles, etc.), and a label for the neural network may be the level of risk that was achieved in the driving scenarios that followed the event, up to a certain prediction horizon (for instance a horizon of 10 or 20 seconds after the event).

In some embodiments, these same other types of characterizations (reaction-time/attentiveness skills and negotiation skills) may also be applicable to an autonomous driving system. For example, in these embodiments, the autonomous driving system may be characterized at 210, reaction times of the autonomous driving system may be determined at 270, and negotiation skills of the autonomous driving system may be determined at 290.

As shown in FIG. 2, the guard sub-system 240 may take one or more of the above as input and determine a decision as to whether the autonomous driving system or the human driver should be in control of the vehicle. The decision may be based on one or more of the current state of the vehicle, the predicted trajectory, the reaction time of the human driver, and/or the negotiation skills of the human driver, among others. The guard sub-system 240 may predict what may occur next and whether or not the human driver may have the skill to deal with the scenario, and may determine whether the human driver or the autonomous driving system should manage the vehicle through the scenario. In some embodiments, the guard sub-system 240 may comprise a rules-based algorithm. In these embodiments, the rules may have been pre-defined as a part of the algorithm.

Characterization of the autonomous driving system may be performed by applying the methods disclosed in U.S. application Ser. No. 16/232,210, titled "Processing System for Evaluating Autonomous Vehicle Control Systems Using Machine Learning." The evaluation system may provide a group of degraded patterns that provide the sequence of scenarios and driving actions where the autonomous system may act unsafely or underperform. In this case, the methods provided for the characterization of the autonomous system may be used to predict future trajectories 230 the autonomous vehicle may develop in the future.

One method for making such a prediction is to use the group and sequences of driving actions collected and clustered into the driving patterns generated by the methods described in U.S. application Ser. No. 16/232,210, and generate a reward function for the autonomous driving system in a similar manner to that described above for the human driver (for example, by obtaining the weights of the reward function).

An alternate method for predicting future trajectories 230 is to use the sequences of driving actions for the driving patterns detected with the methods described in U.S. application Ser. No. 16/232,210, and use Generative Adversarial Imitation Learning (GAIL), which may provide a learning machine capable to predict driving actions, given a state of the vehicle. With an initial state, the next state of the vehicle may be determined with GAIL's predicted action (using laws of physics to obtain the next state, by applying the driving action to the current state). The same procedure may then be applied, using the next state as the current state, to determine the predicted action and next state, in an iterative manner. Thus, a trajectory roll-out may be determined, based on this procedure.

Another method for the prediction of future trajectories 230 is to add a stochastic component to such a determination and thus perform Monte Carlo based roll-outs of the trajectory based on the policy. A different method based on the reward function may be used to determine the most likely driving action (based on the probability defined by the policy) and determine the next state, which in turn may be considered the current state, and then determine the next driving action (again based on the policy) and the next state, in an iterative manner.

Figure 3:
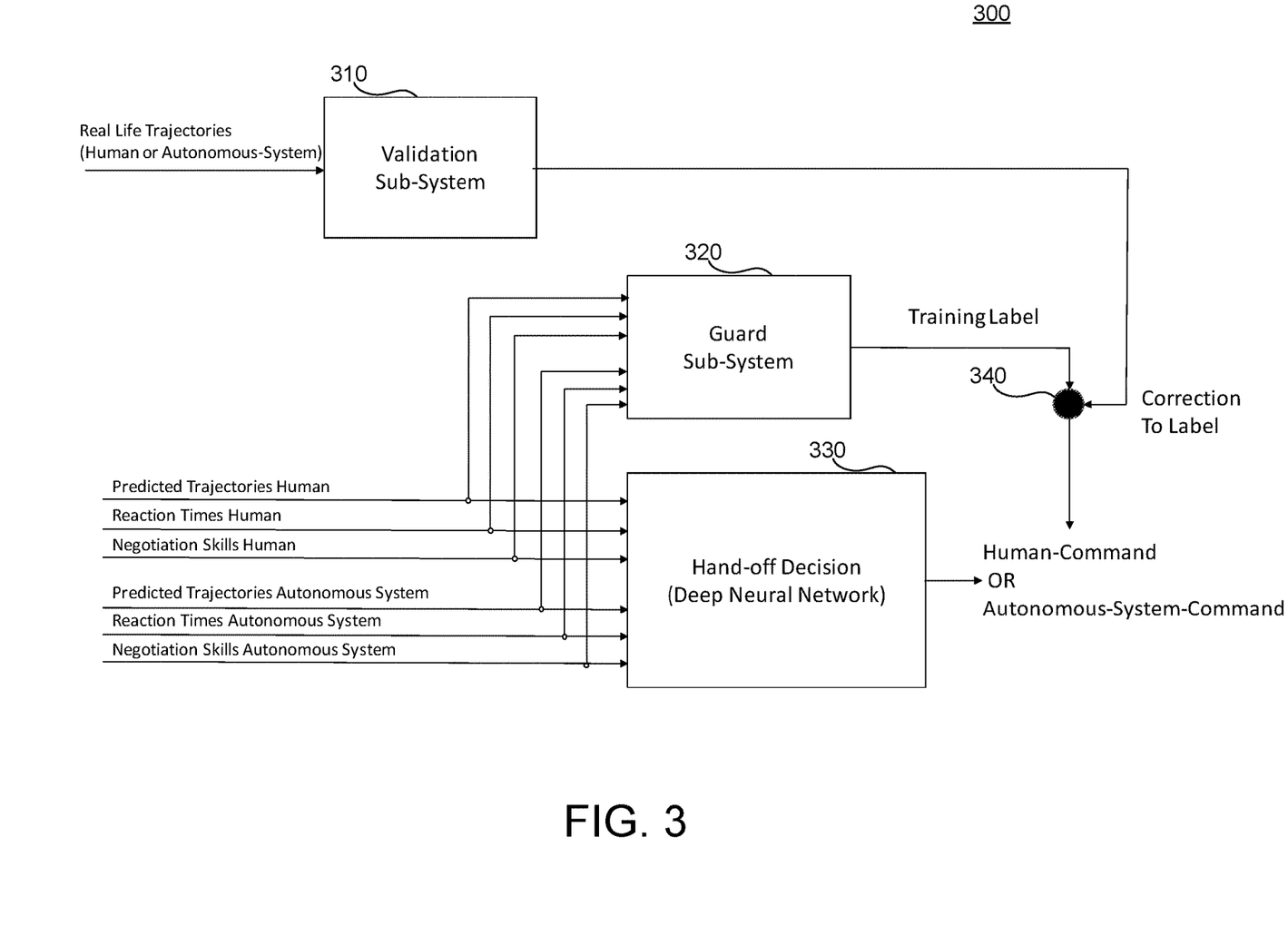
FIG. 3 is a block diagram of a decision system in accordance with one or more aspects described herein.

Referring to FIG. 3, a decision system 300 that determines the better of the two agents may, in various embodiments, be based on a support vector machine, or on a deep neural network trained on multiple examples of driving scenarios.

The decision system 300 may be trained on deployment, once the characterizations for the human driver and the autonomous driving system are completed. The decision system 300 may take inputs including the current state of the vehicle, the current state of the surrounding vehicles, the predicted trajectory that the human driver will take (applying the method described above, which may be customized to the characteristics of the human driver), the predicted trajectory that the autonomous system will take (applying the methods mentioned above that characterize the autonomous driving system), a prediction of the trajectories that neighbor vehicles will take, a prediction of the evolution of the environment, the level of reaction-time skills, and the level of negotiation skills.

In order to predict the trajectories of neighbor vehicles, the same type of characterization that is applied to the human driver as described above may also be applied to the surrounding vehicles, so long as the states and driving actions for these vehicles are observed by the cameras mounted in the vehicle. In some embodiments, the characterization of surrounding vehicles may be less accurate, since this characterization may correspond to an observation period that may be shorter than the period of time allowed to characterize the human driver of the ego-vehicle.

In some embodiments, the level of attention skills and negotiation skills may be provided by other neural networks that have been trained to estimate these skills, and their outputs may be used as inputs to the hand-off decision. The inputs providing information on skills augment the information provided in terms of predicted trajectories, and they deliver an additional dimension that may complete the profile that characterizes either the human driver or the autonomous driving system.

In some embodiments, the predicted trajectories may be encoded/represented by a sequence of future states that either the human driver may generate or that the autonomous driving system may generate. The evolution of the environment mentioned above may be represented by a sequence of future states for other components of the environment that could pose risk, such as pedestrians, bicyclists, and any other moving object that may be detected by the computer vision technology discussed above.

Labels to be used to train the decision system 300 may be obtained through a guard sub-system 320 (also shown in FIG. 2 with reference number 240) which may act initially as a teacher. This guard sub-system 320 may evaluate the predicted trajectories and assess risk of collision for every component involved in the driving scenario. For example, the predicted trajectory for the autonomous system may be evaluated for proximity to other vehicles and a corresponding assessment of risk may be computed, continuously, with increased risk corresponding to a closer proximity. Predicted collisions may be taken into account. The guard sub-system 320 may be based on pre-determined rules that provide an a-priori assessment of risk.

Additionally, in some embodiments, the guard sub-system 320 may receive input on reaction-time skills and negotiation skills, in order to provide some tolerance margins on the assessment of risk. For instance, even though a predicted trajectory may indicate a change in position for a surrounding vehicle that may result in a very low proximity to the ego-vehicle, if the reaction-time skills of the human driver are high, then the risk may be lower for this specific driver. Thus, in some embodiments, the negotiation skills and reaction time skills may be used by the decision system to modulate the final level of risk.

In some embodiments, the guard sub-system 320 may continuously estimate the current level of attentiveness of the driver. There are several methods which may be employed to perform this operation. In some embodiments, a delay that exists between the leader vehicle (a vehicle in front of the ego-vehicle) making a change in speed and the ego-vehicle adjusting its own speed to adapt to the change may be measured. In some embodiments, the guard sub-system 320 may go through the predicted trajectory with the predicted reaction time and, if it determines that, for a given change in scenario, the predicted reaction time of the human driver would put the ego-vehicle too close to a surrounding vehicle, then the guard sub-system 320 may decide not to hand-off command to the human driver. As described below, given real-life validation of outcomes, this situation may be relaxed.

Once the human driver or the autonomous driving system takes command of the vehicle and the characterizations for both agents are complete, then the predicted trajectories may be used to determine a decision, based on the guard sub-system 320 rules, and then the decision of whether the human driver or the autonomous driving system should take over command of the vehicle may be generated, and this may become a label 340 for use in training the deep neural network 330 (or, in some embodiments, a Scalable Vector Machine (SVM)). Once a sufficient number of predicted trajectories and decisions/labels have been collected, then training of the deep neural network 330 may begin. The deep neural network 330, once trained, may become responsible for making the decision discussed above. In some embodiments, the decision output by the deep neural network may be binary, such as a flag having two states indicative of "human" or "machine", for example.

In some embodiments, the presence of a deep neural network 330 may be redundant, since the guard sub-system 320 may be able to make all the decisions based on rules. However, the characterizations of the human driver and of the autonomous driving system may not be perfect for all situations. Accordingly, in some embodiments, since the decision system 300 may have access to the evolution of the driving scenario after the decision has been made, the decisions made by the guard sub-system 320 may be evaluated for their outcome. In these embodiments, the risk assessment may continue through a validation sub-system 310, which may evaluate the real-world proximity of the ego-vehicle to all the other vehicles and obstacles in real-time (in contrast to the guard sub-system, which may perform evaluations based on predicted trajectories). These evaluations may provide corroboration of the degree of success of the hand-off decision.

In addition, the deep neural network 330 may be better able to handle scenarios that may be unexpected, as the guard sub-system may not have rules to address these types of scenarios. Accordingly, in some embodiments, it is the deep neural network 330 that is given responsibility for making the decision.

As discussed above, the validation sub-system 310 may detect patterns of wrong hand-off decision making, by assessing the level of risk that was actually experienced in real-life, and thus it may provide a correction to the hand-off decision performed by the guard sub-system 320. In this case, the validation sub-system 310 may generate a label, different than the one that was generated by the guard sub-system 320, and thus this label may be used to re-train the deep neural network 330 in charge of providing the hand-off decision. FIG. 3 provides a diagram showing exemplary interactions and flow of information between the guard sub-system 320, the validation sub-system 310, and the hand-off decision module (deep neural network 330).

It should be understood that the guard sub-system 320 and the deep neural network 330 may disagree in some decisions. The validation sub-system 310 may corroborate, based on actual observation, whether any decision that has been generated by the guard sub-system 320 is correct, given what happened after the decision was made. The validation sub-system 310 may have access to what happened after the decision, as discussed above, because it may monitor continuously what occurs after every decision is provided. Therefore, if the validation sub-system 310 disagrees with the guard sub-system 320 (based on real-life outcomes after the decision), then a correction in the training of the neural network 330 may occur. Thus, after the correction, a disagreement between the guard sub-system 320 and the neural network 330 may occur for the driving scenario where the validation sub-system 310 applied the correction. In some embodiments, the validation sub-system 310 may be rules based.

In some embodiments, in order to ensure that the corrections performed by the validation sub-system 310 are consistent, pattern formation analysis may be performed. In these embodiments, the state and predicted trajectories involved in the training of the neural network 330 may be clustered together using unsupervised learning procedures, and an assessment of deviation between the risk assessed by the guard sub-system 320 and the real-life risk assessed by the validation sub-system 310 may be averaged for these clusters. Then, the clusters that present the greatest deviations for risk may be singled out and, if more instances of disagreement between the guard sub-system 320 and the validation sub-system 310 are detected in the future for patterns (i.e., states and predicted trajectories) that correspond to the singled-out cluster, then re-training of the deep neural network 330 may be performed. This may ensure a proper correction of a hand-off decision. The characterizations of the human driver and the autonomous driving system may, in some embodiments, have their own correction methods based on observation of real-life outcomes. Nevertheless, the correction provided here to the deep neural network 330 based hand-off decision may still be necessary as an added component of validation. For example, these methods may increase the confidence on the overall system.

Rather than performing training based on neural networks or SVMs, in some embodiments, Long Short Term Memory (LSTM) training may be used on the sequence of scenarios and driving actions. The decision system 300, in this case, may be trained to recognize the leading conditions causing the autonomous driving system to fail (or for the human driver to fail), and it may identify the sequence of states (the trajectory) before the occurrence of an autonomous driving system failure.

With both characterizations, it may be possible to perform an accurate assessment of the suitability of each agent for taking control of the vehicle. In some embodiments, a model may decide which agent is better for any driving scenario/situation. This aspect may use formal methods in building decision system 300.

Figure 4:
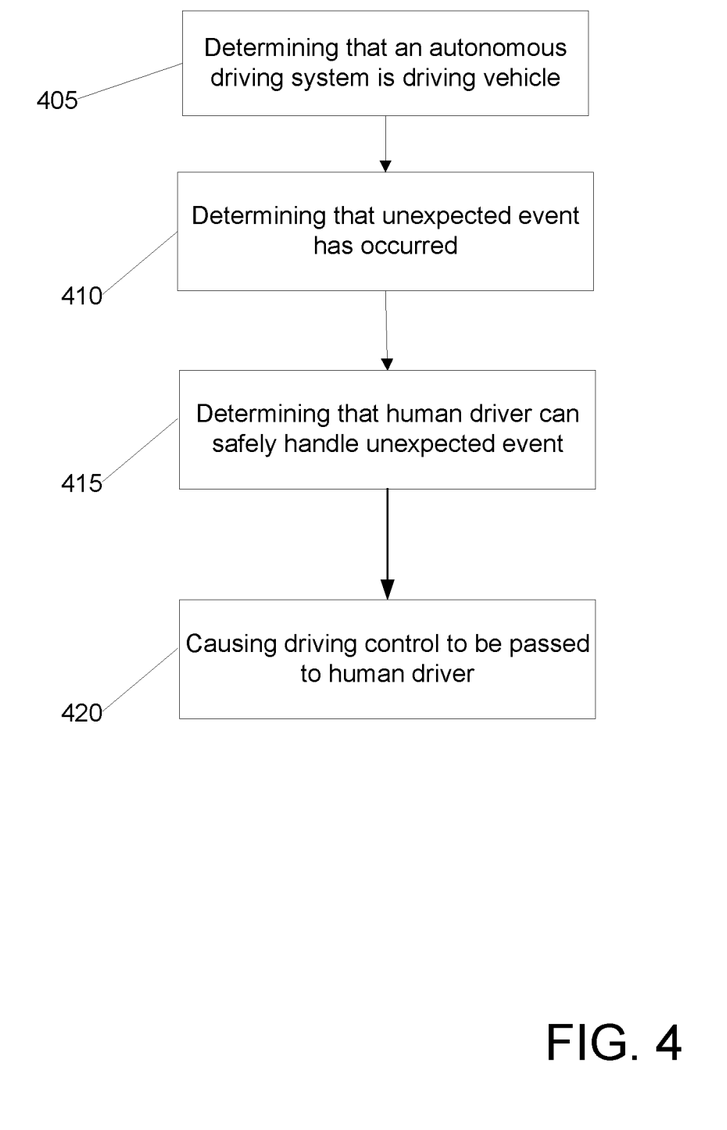
FIG. 4 illustrates an exemplary method for safe hand-off to a human driver, in accordance with one or more aspects described herein.

Referring to FIG. 4, at step 405 it may be determined that an autonomous driving system is driving a vehicle. In some embodiments, the autonomous driving system may output an indicator to indicate whether the autonomous driving system is currently in control of driving the vehicle.

At step 410, it may be determined that an unexpected event has occurred. In some embodiments, an unexpected event may be an event that deviates from a predicted driving scenario. For example, while a vehicle is being driven along a lane of a highway, it may be predicted that the vehicle will continue to be driven along the lane of the highway, at least for some time, such as for the next ten seconds. If an environmental sensor detects that another vehicle has suddenly veered into the lane, for example, alongside the ego-vehicle, such that a collision is likely imminent, this may be considered an unexpected event. It should be understood that the methods and computing systems described herein are not limited in this regard.

At step 415, it may be determined that the human driver can safely handle the unexpected event. In some embodiments, the autonomous driving system may not be able to handle an unexpected event. In other embodiments, the autonomous driving system may not gracefully handle the unexpected event. For example, pulling over and stopping may be the default behavior of the autonomous driving system when it encounters an unexpected event. In these cases, it may be preferred for the human driver to handle the unexpected event, if the human driver can be expected to do so safely.

In some embodiments, a determination that the human driver can safely handle an unexpected event may be based on an amount of time that it may take the human driver to regain control of the vehicle. Even under a scenario where this delay to take control could be a problem, the type of human driving characterization that has been described above can provide valuable information to assess the feasibility of handing-off control to the human driver. If the characterization shows that the attentiveness and reaction time of the human driver are adverse and would not allow safe hand-off, then the vehicle may proceed to slow down and/or pull over safely (such as may be the default behavior of the autonomous driving system).

Additionally, through the autonomous vehicle characterization that has also been described above, it may be known which driving situations are problematic to the autonomous vehicle. As part of the characterization, these driving situations may be predicted ahead of time, because the conditions leading to these driving situations may be learned on-deployment, which may generate a "look ahead" process that may increase the amount of time available for the human driver to take control. Unless there is a continuous characterization of the autonomous vehicle on deployment, the conditions leading to the situation where this system may be unsafe and inadequate may not be known. Therefore, again both types of characterizations (for the human and for the autonomous system) may be preferred, in some embodiments.

Using risk analytics, the decision system may provide real-time estimates of unsafe or catastrophic situations. The following examples describe decisions that may be taken, for various scenarios.

Impact, or less than 3 seconds to impact (no dependence on hand-off to human): If the time frame for the impending unsafe situation is deemed too short for a human driver to regain control (for example, less than 3 seconds, or has already taken place) the vehicle may retain control and slow down, pull over, and stop. The vehicle may simultaneously signal the human driver to take control, but the vehicle may proceed to a safe situation while the human driver is regaining control. Some examples of this scenario may include immediate loss of critical sensors, vehicle hit by another vehicle or object (tree fallen on the car, power line on car), detection of a problem in the roadway (such as the detection of a "bridge out" sign), earthquake, pedestrian jumping into path, complete loss of traction because of flood or ice, and examination of other leading conditions for an autonomous vehicle to fail.

Immediate risk ahead, such as 3 to 30 seconds until impact (human hand-off depending on driver skill): If the timeframe to the unsafe situation is 3 to 30 seconds, then driver classification may determine if the human driver should take control, depending upon their skill level and the estimated time to impact. If the driver skill level is deemed to be so low that they cannot regain control, then the vehicle may slow down, pull over, and stop. Some examples of this scenario may include when vehicle sensors are failing, mapping is not available, bad traffic or an accident is immediately ahead, an unsafe driver is in vicinity, vehicle is losing traction, unexpected pedestrian traffic is ahead, etc.

Risk on horizon, such as more than 30 seconds ahead (human hand-off influenced by driver skill): If the timeframe to the unsafe situation is more than 30 seconds, the driver classification technology may determine the appropriate hand-off based on driver skill levels. If the human driver skill level is deemed to be low so that they cannot regain control, then the vehicle may slow down, pull over, and stop. Examples of this scenario may include traffic stoppage or backup ahead, dangerous situation/object on road ahead, and leading conditions for an autonomous vehicle to fail.

The timeframes used above are example timeframes, based on the amount of time it typically takes a human to regain control of a vehicle. However, these are merely examples, and other timeframes are contemplated in accordance with the teachings herein.

At step 420, the driving control of the vehicle may be caused to be passed from the autonomous driving system to the human driver. For example, a warning, such as an audible alert, a haptic alert, a visual alert, or other indicators may be used to inform the human driver that control is being handed over from the autonomous driving system. The human driver may then resume control of the vehicle in order to handle the unexpected event.

While FIG. 4 shows control being passed to a human driver, it should be understood that there are scenarios where the control is instead passed to the autonomous driving system, according to the embodiments herein. For example, in some embodiments, it may be determined that the human driver cannot likely safely handle the unexpected event. In these embodiments, the driving control of the vehicle may be caused to be passed to the autonomous driving system.

Aspects of the invention have been described in terms of illustrative embodiments thereof. Numerous other embodiments, modifications, and variations within the scope and spirit of the description will occur to persons of ordinary skill in the art from a review of this disclosure. For example, one of ordinary skill in the art will appreciate that the steps disclosed in the description may be performed in other than the recited order, and that one or more steps may be optional in accordance with aspects of the invention.

What is claimed is:

1. A method comprising:
   determining, by a computing device, that an autonomous driving system is driving a vehicle with a human driver therein;
   determining that an unexpected event associated with a conflict has occurred in a driving scenario;
   retrieving a model that captures attributes personalized to the human driver, wherein the model is based on a plurality of weighted feature functions, wherein each weighted feature function outputs a numerical value associated with a deviation from a policy computed for the human driver associated with at least one of speed, heading, or distance to a lane marker;
   based on setting a current vehicle state as an input of the model, generating a simulated driving action, including a predicted trajectory;
   determining that the human driver can safely handle the unexpected event based on the predicted trajectory passing a safety threshold; and
   causing driving control of the vehicle to be passed to the human driver.

2. The method of claim 1, wherein an optimal policy is based on a probability distribution of driving actions given a specific vehicle state.

3. The method of claim 2, wherein each weighted feature function comprises a score associated with a driving action taken by the human driver.

4. The method of claim 1, wherein the model of the human driver calculates a reaction time or an indication of negotiation skills.

5. The method of claim 1, wherein the determining that the human driver can safely handle the unexpected event comprises determining, by a neural network, that the human driver can safely handle the unexpected event.

6. The method of claim 5, further comprising:
   training the neural network based on labels generated by a rules-based guard sub-system.

7. The method of claim 6, further comprising:
   training the neural network by correcting an output of the rules-based guard sub-system, wherein the correcting is based on an observation of results of a previous decision made by the rules-based guard sub-system.

8. The method of claim 1, wherein the unexpected event comprises: an incursion into a lane occupied by the vehicle, a stationary object in a path of the vehicle, or a loss of critical sensors.

9. The method of claim 1, wherein the determining that the human driver can safely handle the unexpected event comprises:
   determining that a reaction time of the human driver is less than a predicted time to an unsafe vehicle position.

10. A computing platform, comprising:
    at least one processor;
    a communication interface; and
    memory storing computer-readable instructions that, when executed by the at least one processor, cause the computing platform to:
      determine, by a computing device, that an autonomous driving system is driving a vehicle with a human driver therein;
      determine that an unexpected event associated with a conflict has occurred in a driving scenario;
      retrieve a model that captures attributes personalized to the human driver, wherein the model is based on a plurality of weighted feature functions, wherein each weighted feature function outputs a numerical value associated with a deviation from a policy computed for the human driver associated with at least one of speed, heading, or distance to a lane marker;
      based on setting a current vehicle state as an input of the model, generate a simulated driving action, including a predicted trajectory;
      determine that the human driver can safely handle the unexpected event based on the predicted trajectory passing a safety threshold; and
      cause driving control of the vehicle to be passed to the human driver.

11. The computing platform of claim 10, wherein an optimal policy is based on a probability distribution of driving actions given a specific vehicle state.

12. The computing platform of claim 10, wherein the model of the human driver calculates a reaction time or an indication of negotiation skills.

13. The computing platform of claim 10, wherein the memory stores additional computer-readable instructions that, when executed by the at least one processor, cause the computing platform to determine that the human driver can safely handle the unexpected event by causing the computing platform to:
   determine, by a neural network, that the human driver can safely handle the unexpected event.

14. The computing platform of claim 13, wherein the memory stores additional computer-readable instructions that, when executed by the at least one processor, cause the computing platform to:
   train the neural network based on labels generated by a rules-based guard sub-system.

15. The computing platform of claim 14, wherein the memory stores additional computer-readable instructions that, when executed by the at least one processor, cause the computing platform to:
   train the neural network by correcting an output of the rules-based guard sub-system, wherein the correcting is based on an observation of results of a previous decision made by the rules-based guard sub-system.

16. The computing platform of claim 10, wherein the unexpected event comprises: an incursion into a lane occupied by the vehicle, a stationary object in a path of the vehicle, or a loss of critical sensors.

17. The computing platform of claim 10, wherein the memory stores additional computer-readable instructions that, when executed by the at least one processor, cause the computing platform to determine that the human driver can safely handle the unexpected event by causing the computing platform to:
   determine that a reaction time of the human driver is less than a predicted time to an unsafe vehicle position.

18. One or more non-transitory computer-readable media storing instructions that, when executed by a computing platform comprising at least one processor, a communication interface, and memory, cause the computing platform to:
   determine, by a computing device, that an autonomous driving system is driving a vehicle with a human driver therein;
   determine that an unexpected event associated with a conflict has occurred in a driving scenario;
   retrieve a model that captures attributes personalized to the human driver, wherein the model is based on a plurality of weighted feature functions, wherein each weighted feature function outputs a numerical value associated with a deviation from a policy computed for the human driver associated with at least one of speed, heading, or distance to a lane marker;
   based on setting a current vehicle state as an input of the model, generate a simulated driving action, including a predicted trajectory;
   determine that the human driver can safely handle the unexpected event based on the predicted trajectory passing a safety threshold; and
   cause driving control of the vehicle to be passed to the human driver.

\* \* \* \* \*